US007711626B2

(12) United States Patent  (10) Patent No.: US 7,711,626 B2
Nanjundamoorthy et al.  (45) Date of Patent: May 4, 2010

(54) SYSTEMS, METHODS, AND COMPUTER PROGRAM PRODUCTS FOR ADJUSTING THE ASSETS OF AN INVESTMENT ACCOUNT

(75) Inventors: Hari Nanjundamoorthy, Windsor, NJ (US); Charles R. Smith, III, Hoboken, NJ (US); Michele Pierdinock, Red Bank, NJ (US); William McKinney, Westfield, NJ (US); Lavinia S. Zyvith, Belle Mead, NJ (US); Reo A. Gonzales, Fair Lawn, NJ (US); Joseph A. Barone, Nutley, NJ (US)

(73) Assignee: Checkfree Corporation, Norcross, GA (US)

( * ) Notice: Subject to any disclaimer, the term of this patent is extended or adjusted under 35 U.S.C. 154(b) by 542 days.

(21) Appl. No.: 11/480,688

(22) Filed: Jun. 30, 2006

(65) Prior Publication Data

US 2008/0016010 A1    Jan. 17, 2008

(51) Int. Cl.
   *G06Q 40/00*    (2006.01)
(52) U.S. Cl. .................. 705/36 R; 705/35; 705/36; 705/37; 705/38; 705/39; 705/40; 705/41; 705/42; 705/43; 705/44; 705/45
(58) Field of Classification Search .............. 705/35–45
   See application file for complete search history.

(56) References Cited

U.S. PATENT DOCUMENTS

| 4,566,066 | A | * | 1/1986 | Towers ...................... 705/36 R |
| 4,674,044 | A | * | 6/1987 | Kalmus et al. ................ 705/37 |
| 4,751,640 | A | * | 6/1988 | Lucas et al. ............... 705/36 R |
| 5,126,936 | A | * | 6/1992 | Champion et al. ........ 705/36 R |
| 5,132,899 | A | * | 7/1992 | Fox .......................... 705/36 R |
| 5,270,922 | A | * | 12/1993 | Higgins ....................... 705/37 |
| 5,819,238 | A | * | 10/1998 | Fernholz .................. 705/36 R |
| 5,978,778 | A | * | 11/1999 | O'Shaughnessy ......... 705/36 R |
| 6,021,397 | A | * | 2/2000 | Jones et al. ............... 705/36 R |
| 6,052,673 | A | * | 4/2000 | Leon et al. ................... 705/38 |
| 6,092,056 | A | * | 7/2000 | Tull et al. ................. 705/36 R |
| 6,161,098 | A | * | 12/2000 | Wallman .................. 705/36 T |

(Continued)

FOREIGN PATENT DOCUMENTS

WO    WO2007/002975    *    1/2007

OTHER PUBLICATIONS

Blanco, Roberto. The Euro-Area Government Securities Markets. Recent Develpopments and Implications for Market Functioning. Autumn Central Bank Economist's Meeting, Oct. 2001.*

*Primary Examiner*—Charles R Kyle
*Assistant Examiner*—Robert R Niquette
(74) *Attorney, Agent, or Firm*—Sutherland Asbill & Brennan LLP

(57) ABSTRACT

Methods of the present invention identify an asset allocation model and at least one security associated there with. An investment account portfolio is stored that includes at least one substitute security associated with the identified at least one security. A virtual portfolio is then generated that includes the identified at least one security. A tax lot is created for the identified at least one security to identify a total value for the at least one security, and the method determines whether the virtual portfolio complies with the asset allocation model. The identified at least one security associated with the asset allocation model is restricted from the investment account portfolio.

22 Claims, 8 Drawing Sheets

U.S. PATENT DOCUMENTS

| | | | |
|---|---|---|---|
| 6,175,824 B1* | 1/2001 | Breitzman et al. | 705/36 R |
| 6,272,474 B1* | 8/2001 | Garcia | 705/36 R |
| 6,484,151 B1* | 11/2002 | O'Shaughnessy | 705/36 R |
| 6,493,681 B1* | 12/2002 | Tertitski et al. | 705/36 R |
| 7,117,176 B2* | 10/2006 | Wallman | 705/36 R |
| 7,158,951 B2* | 1/2007 | Stark | 705/37 |
| 7,177,831 B1* | 2/2007 | O'Shaughnessy et al. | 705/37 |
| 7,590,582 B2* | 9/2009 | Dunne | 705/36 R |
| 2001/0042037 A1* | 11/2001 | Kam et al. | 705/36 |
| 2002/0103733 A1* | 8/2002 | Barrington et al. | 705/35 |
| 2002/0174045 A1* | 11/2002 | Arena et al. | 705/36 |
| 2004/0073506 A1* | 4/2004 | Tull et al. | 705/36 |
| 2004/0167849 A1* | 8/2004 | Yass et al. | 705/37 |
| 2005/0027632 A1* | 2/2005 | Zeitoun et al. | 705/36 |
| 2005/0055301 A1* | 3/2005 | Cohen et al. | 705/36 |
| 2005/0171892 A1* | 8/2005 | Naas et al. | 705/37 |
| 2005/0228734 A1* | 10/2005 | Pagani | 705/36 |
| 2005/0234793 A1* | 10/2005 | Staub | 705/36 |
| 2005/0234795 A1* | 10/2005 | Hodes et al. | 705/36 |
| 2006/0010053 A1* | 1/2006 | Farrow | 705/35 |
| 2006/0206400 A1* | 9/2006 | Usui | 705/35 |
| 2006/0277127 A1* | 12/2006 | Pierdinock et al. | 705/35 |
| 2007/0094119 A1* | 4/2007 | Marques | 705/36 R |
| 2007/0130043 A1* | 6/2007 | O'Shaughnessy et al. | 705/36 R |
| 2007/0168273 A1* | 7/2007 | Barone et al. | 705/36 R |
| 2007/0192223 A1* | 8/2007 | Cifrese et al. | 705/36 R |

* cited by examiner

| Asset | Replacement Securities | % of Total Account Value |
|---|---|---|
| MER | SUNW | 25% |
| CSCO | | 25% |
| CKFR | | 25% |
| IBM | MSFT | 25% |
| Cash | | 0% |

| Asset | Model % | Account % | Value |
|---|---|---|---|
| MER | 25% | 0% | $0 |
| CSCO | 25% | 0% | $0 |
| CKFR | 25% | 0% | $0 |
| IBM | 25% | 0% | $0 |
| Cash | 0% | 100% | $100,000 |

| Trade Order # | Trade |
|---|---|
| 1 | Buy $25,000 of MER |
| 2 | Buy $25,000 of CSCO |
| 3 | Buy $25,000 of CKFR |
| 4 | Buy $25,000 of IBM |

| New Trade Order # | Trade |
|---|---|
| 1 | Buy $25,000 of SUNW |
| 2 | Buy $25,000 of MSFT |

| Trade Order # | Trade |
|---|---|
| 4 | Buy $8,333 of CSCO |
| 5 | Buy $8,333 of CKFR |
| 6 | Buy $8,333 of MSFT |

| Asset | Current Price |
|---|---|
| CSCO | $19.025 |
| CKFR | $45.000 |
| MSFT | $24.800 |

FIG. 8

| Asset | | Model % | Account % | Value |
|---|---|---|---|---|
| MER | SUNW | 25% | 0% | $0 |
| CSCO | | 25% | 33.3% | $33,332 |
| CKFR | | 25% | 33.3% | $33,300 |
| IBM | Substituted With: MSFT | 25% | 33.3% | $33,331 |
| Cash | | 0% | 0.0% | $37 |

| Tax Lot # | Asset | Current Price | Units | Value |
|---|---|---|---|---|
| 1 | CSCO | $19.025 | 1314 | $24,999 |
| 2 | CKFR | $45.000 | 555 | $24,975 |
| 3 | MSFT | $24.800 | 1008 | $24,998 |
| 4 | CSCO | $19.025 | 438 | $8,333 |
| 5 | CKFR | $45.000 | 185 | $8,325 |
| 6 | MSFT | $24.800 | 336 | $8,333 |
| | Cash | | | $37 |
| | TOTAL | | | $100,000 |

900

| Asset | Model % | Account % | Drift |
|---|---|---|---|
| MER | 25% | 0% | -25% |
| CSCO | 25% | 33.3% | +13.3% |
| CKFR | 25% | 33.3% | +13.3% |
| IBM | 25% | 33.3% | +13.3% |
| Cash | 0% | 0.0% |  |
| Substituted With: MSFT | | | |

FIG. 10

| Substituted Tax Lot | Initial Model Security Replaced |
|---|---|
| 3 | IBM |
| 4 | MER |
| 5 | MER |
| 6 | MER |

FIG. 11

| Tax Lot | Actual Security | Virtual Security |
|---|---|---|
| 1 | CSCO | CSCO |
| 2 | CKFR | CKFR |
| 3 | MSFT | IBM |
| 4 | CSCO | MER |
| 5 | CKFR | MER |
| 6 | MSFT | MER |

| Tax Lot # | Virtual Security | Actual Security | Current Price/Unit | Units | Market Value | % of Portfolio | Cost Basis |
|---|---|---|---|---|---|---|---|
| 1 | CSCO | CSCO | $17.500 | 1314 | $22,995 | 22.57% | $24,999 |
| 2 | CKFR | CKFR | $49.000 | 555 | $27,195 | 26.69% | $24,975 |
| 3 | IBM | MSFT | $26.000 | 1008 | $26,208 | 25.72% | $24,998 |
| 4 | MER | CSCO | $17.500 | 438 | $7,665 | 7.52% | $8,333 |
| 5 | MER | CKFR | $49.000 | 185 | $9,065 | 8.90% | $8,325 |
| 6 | MER | MSFT | $26.000 | 336 | $8,736 | 8.57% | $8,333 |
| | | Cash | | | $37 | 0.04% | $37 |
| | | TOTAL | | | $101,901 | 100.01% | $100,000 |

| Tax Lot #s | Virtual Security | Model % | Model $ | Current $ | Drift $ | Current % | Drift % |
|---|---|---|---|---|---|---|---|
| 4, 5, 6 | MER | 25% | $25,475.25 | $25,466 | -$9.25 | 24.99% | -0.01% |
| 1 | CSCO | 25% | $25,475.25 | $22,995 | -$2,480.25 | 22.57% | -2.43% |
| 2 | CKFR | 25% | $25,475.25 | $27,195 | +$1,719.75 | 26.69% | +1.69% |
| 3 | IBM | 25% | $25,475.25 | $26,208 | +$732.75 | 25.72% | +0.72% |
|  | Cash | 0% | $0 | $37 | +$37 | 0.04% | +0.04% |

| Virtual Security | Tax Lot #s | Actual Security | Target $s | Current Price/Unit | Units | Type of Trade | Actual $s |
|---|---|---|---|---|---|---|---|
| CSCO | 1 | CSCO | +$2,480.25 | $17.500 | 141 | Buy | +$2467.50 |
| CKFR | 2 | CKFR | -$1,719.75 | $49.000 | 35 | Sell | -$1715.00 |
| IBM | 3 | MSFT | -$732.75 | $26.000 | 28 | Sell | -$728.00 |
|  |  | Cash | -$37 |  |  |  | -$24.50 |

SYSTEMS, METHODS, AND COMPUTER PROGRAM PRODUCTS FOR ADJUSTING THE ASSETS OF AN INVESTMENT ACCOUNT

FIELD OF THE INVENTION

The present invention relates to investment portfolio management, and more particularly to methods, systems, and computer program products for monitoring and adjusting the mix of assets in modeled investment accounts subject to trade orders, investment restrictions, and restriction resolution rules.

BACKGROUND OF THE INVENTION

Investment accounts hold stocks, bonds, mutual funds, and the like for individuals, trusts, corporations, and other investors. Investors typically utilize such accounts to achieve long and short term savings goals and as an aid in tax planning. The holdings of an investment account may be manipulated by the investor, such as by an investor executing securities purchases or sales via a graphical user interface and an Internet connection. An investor can be any of a number of different types of entities, including an individual or a business. The holdings of an investment account may also be manipulated by an entity managing or otherwise associated with the investment account, such as a money manager, a brokerage firm (sometimes referred to as a broker-dealer or a sponsor), or some other type of investment firm.

Typically, a professionally managed investment account is associated with an asset allocation model that reflects an investment style (e.g., aggressive, growth, value, income) and a money manager's preferred mix of specific assets (e.g., stocks, bonds, cash) in conformity with the style. When an investor establishes an account, the initial investment is distributed among assets in accordance with the model. An investment account such as a multi-strategy portfolio (MSP) account may consist of a number of individual accounts, each of which is associated with its own investment style and model. MSP accounts can also be associated with an overlay model that reflects the relative distribution of assets across sleeves. Additional information on models and their use is described in U.S. patent application Ser. No. 10/372,724, filed Feb. 25, 2003, titled "Multi-style Client Investment Managed Accounts with Transaction Tagging", the contents of which are incorporated herein by reference as if set forth fully herein.

It will be appreciated that an investor may customize a particular investment account associated with an asset allocation model through the use of restrictions. Restrictions constrain the ability to use an investment account to trade security instruments, such as buying or selling stocks. Additional information on restrictions and systems in which they are implemented is disclosed in U.S. application Ser. No. 11/146,015, titled "Automated Actions Based on Restrictions", filed Jun. 7, 2005, and U.S. application Ser. No. 11/389,909, titled "Systems, Methods, and Computer Program Products for Processing Orders Subject to Investment Restrictions", filed Mar. 27, 2006 (collectively the "Restriction Applications"), the entire contents of both of which are incorporated herein by reference as if set forth fully herein. Restrictions are typically associated with explicit or implicit resolution rules that indicate actions are taken when a restriction violation is detected. For instance, if a restriction stipulates that a particular security cannot be purchased, the resolution rule may stipulate that the assets that were to be used for the restricted purchase be left as cash in the investment account.

It will be appreciated that over time the mix of assets in an investment account (or a sleeve within an account) subject to an investment allocation model may deviate from an ideal mix defined by the model because of specifically ordered trades, ad-hoc deposits of assets that are not part of the model, or investment gains and losses. This deviation is referenced generally herein as drift. Drift from an allocation model is typically calculated either periodically or on an ad hoc basis, and certain portfolio management functions and/or trading tools take into account allocation models and drift. Additionally, it should be appreciated that the drift in an account will intensify after the passage of any time in which investment gains and losses may be incurred.

Traditional monitoring of drift fails to take into account restrictions and their associated resolution rules. This is particularly problematic if restrictions, resolution rules, and allocation models are at odds regarding the appropriate assets to add to an investment account. As a result, functions such as account rebalancing to realign assets to adhere more closely to an asset allocation model may generate a number of unnecessary trade orders or, at the very least, execute unnecessary processing in generating offsetting trade orders. When a large number of accounts with many restrictions and associated resolution rules are under management, this can significantly affect overall system efficiency.

What is needed are methods, systems and computer program products that minimize the drift of an investment account and the processing to correct such drift by taking into account the history of applicable restrictions and their resolutions in portfolio management functions that use an asset allocation model.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 2 shows an illustrative investment account allocation model.

FIG. 3 shows an illustrative investment account after the addition of cash.

FIG. 4 shows an illustrative table of trade orders to effect account rebalancing.

FIG. 8 shows an illustrative table of final account positions for purchased securities.

FIG. 9 shows an illustrative tax lot table.

FIG. 10 shows an illustrative table representing account drift.

FIG. 11 shows an illustrative substitute tax lot table.

FIG. 12 shows an illustrative virtual securities table.

FIG. 13 shows an illustrative virtual tax lot table.

FIG. 14 shows an illustrative table of tax lots by virtual securities.

FIG. 15 shows an illustrative table of tax lots with virtual and actual securities.

DETAILED DESCRIPTION

The present invention now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The present invention is described below with reference to block diagrams and flowchart illustrations of systems, methods, apparatuses and computer program products according to an embodiment of the invention. It will be understood that each block of the block diagrams and flowchart illustrations, and combinations of blocks in the block diagrams and flowchart illustrations, respectively, can be implemented by computer program instructions. These computer program instructions may be loaded onto one or more general purpose computers, special purpose computers, or other programmable data processing apparatuses to produce a system of one or more machines, such that the instructions which execute on one or more computers or other programmable data processing apparatuses create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory are embodied in an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Figure 1:
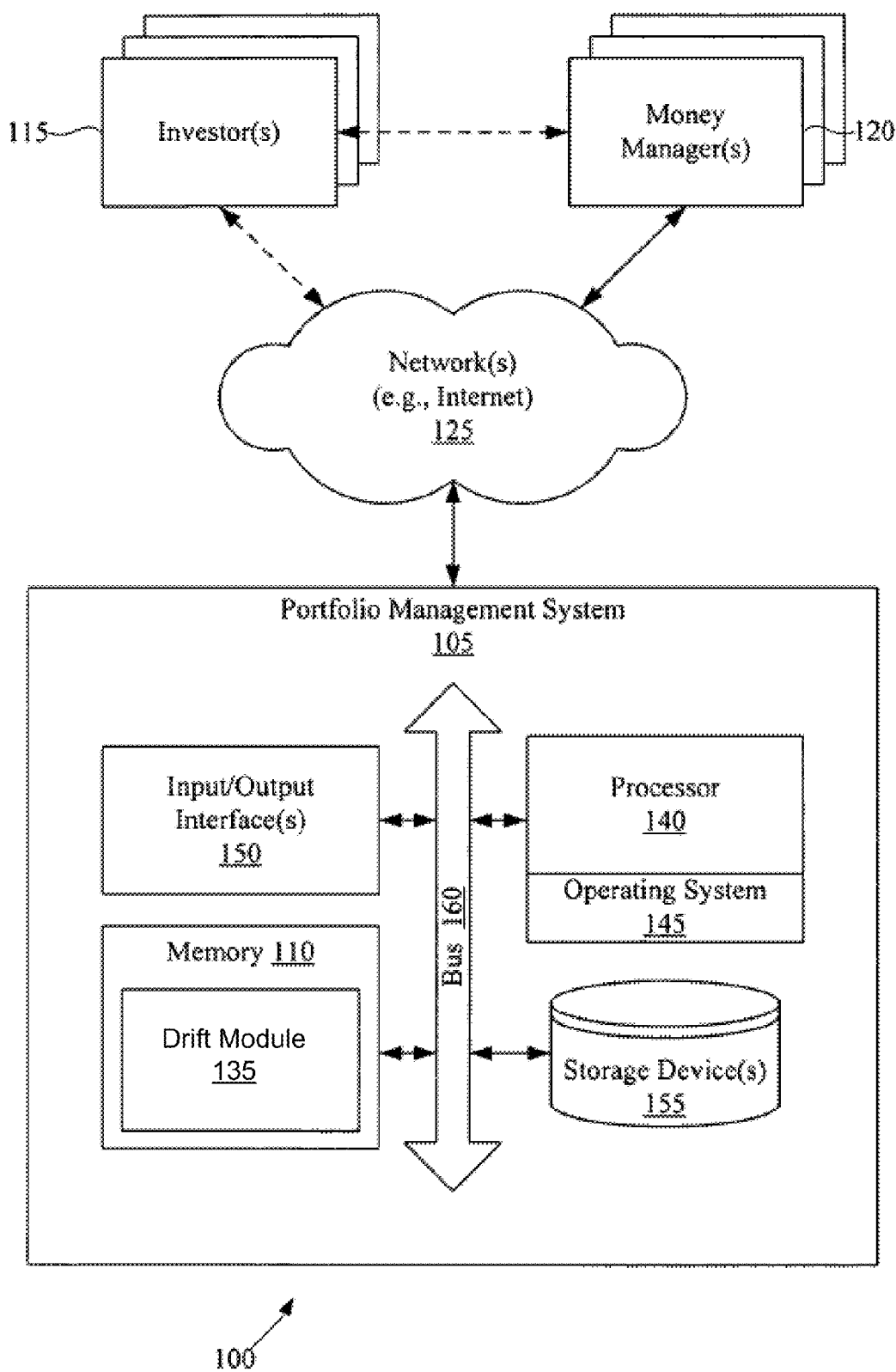
FIG. 1 shows an investment system, according to an illustrative embodiment of the present invention.

Referring now to FIG. 1, an investment system 100 in accordance with an illustrative embodiment of the present invention is shown. The investment system 100 generally includes a portfolio management system 105 operable to receive instructions from one or more investors 115 and/or one or more money managers 120. Among other functions, the portfolio management system 105 can receive trade orders, such as orders to buy or sell securities, and can execute such orders. As described in greater detail below, the portfolio management system 105 is further operable to collectively process trade orders subject to one or more restrictions, to execute restriction resolutions, and to monitor and adjust the mix of assets, such as securities and cash, in investment accounts while attempting to satisfy an investment allocation model and one or more restrictions. To effect such processing, the portfolio management system 105 includes at least one memory 110 and a drift module 135 stored therein to evaluate and process trade orders while monitoring the mix of assets in an investment account governed by (or subject to) an allocation model. In particular, the drift module 135 includes one or more algorithms operable to determine what trades are necessary to realign the account holdings to make them consistent with proportions of the allocation model by considering the cumulative impact of restrictions and resolutions on an investment account subject to an allocation model. The functions of the drift module 135 will be described in greater detail below with reference to FIGS. 2-16.

As shown in FIG. 1, the investor(s) 115 and/or money manager(s) 120 may communicate with the portfolio management system 105 either directly or via one or more networks 125, such as a Local Area Network (LAN), a Wide Area Network (WAN), the Internet, or the like. Although the investor(s) 115 and/or money manager(s) 120 may communicate directly with the portfolio management system 105, the investor(s) 115 optionally may communicate with the money manager(s) 120, which may in turn communicate with the portfolio management system 105 on behalf of the investor(s) 115. For this reason, in FIG. 1 the communication directly between the investor(s) 115 and the one or more networks 125 is shown with a dashed line to indicate that the communication link is optional.

Although illustrated in FIG. 1 as communicating only with the investor(s) 115 and/or the money manager(s) 120 (or brokers), it should be appreciated that the portfolio management system 105 may interface to systems associated with one or more brokers, brokerage firms, investors, and/or other systems that conventionally communicate with investment management systems. Therefore, trade orders, restrictions, and the like may be received by the portfolio management system from entities other than the investor(s) 115 and money manager(s) 120. Communications with those systems may utilize the one or more networks 125 and/or may utilize one or more other networks (not illustrated) and/or dedicated communication links.

It will be appreciated that the methods of communicating with the portfolio management system 105 may include any method well known to those of ordinary skill in the art. Thus, the present invention is not limited to a system in which the portfolio management system 105 receives communications in a particular format or mode, or via particular hardware. For instance, although the present invention can be implemented by utilizing the Internet to facilitate communications directly between a particular user, such as an investor, money manager, or broker, and the portfolio management system 105, any variety of other communication methods can be used to interact with the portfolio management system 105, such as communications via a Plain Old Telephone Service and an Interactive Voice Response system. Moreover, although not described in detail herein, it will be appreciated that some or all communications in the system 100 shown in FIG. 1 may be secure to maintain the confidentiality of data and to authenticate users of the investment system 100.

As shown in FIG. 1, the exemplary portfolio management system 105 of the investment system 100 generally includes a processor 140, operating system 145, bus 160, input/output interface(s) 150, and one or more storage device(s) 155 in addition to the aforementioned drift module 135 residing within the memory 110. The bus 160 includes data and address bus lines to facilitate communication between the processor 140, operating system 145 and the other components within the portfolio management system 105, including the memory 110, the input/output (I/O) interface(s) 150 and the one or more storage device(s) 155. According to one aspect of the invention, the system 105 may represent a system of distributed components that are connected by the bus 160. The processor 140 executes the operating system 145, and together the processor 140 and operating system 145 are operable to execute functions implemented by the portfolio management system 105, including executing software applications stored in the memory 110, as is well known in the art.

Specifically, to implement the methods described herein, the processor 140 and operating system 145, with the I/O interface(s) 150, obtain the trade orders to be executed by the portfolio management system 105. According to one aspect of the invention, the drift module 135 stored within the memory 110 receives the trade orders, restrictions, resolution rules, allocation models, optional trade sorting rules, and other trade-related information input into or received by the system 110. As described in greater detail below with respect to FIGS. 2-16, the drift module 135 includes one or more algorithms for processing that information to determine what trades are necessary to align an account to an account allocation model without requiring undue processing. As described in further detail hereinafter, the drift module 135 maintains a virtual portfolio of securities and/or assets from an allocation model corresponding to substituted securities, and uses the virtual portfolio to determine drift and minimize the number of trades and actions to maintain the account within the allocation model. Therefore, the drift module 135 may be operable to execute computations of parameters, compare the parameters against criteria, process information, and the like, as needed to execute the methods described herein. It will be appreciated that the memory 110 may include random access memory, read-only memory, a hard disk drive, a floppy disk drive, a CD-Rom drive, a DVD-Rom drive, optical disk drive, or the like, for storing information on various computer-readable media.

In order to perform drift analysis and prescribe corrective action for investment accounts subject to allocation models, restrictions, and resolution rules, the drift module 135 utilizes information stored within the one or more storage device(s) 155, which may be connected to the bus 160 by an appropriate interface. The one or more storage device(s) 155 can include random access memory, read-only memory, a hard disk drive, a floppy disk drive, a CD-ROM or RW drive, DVD-ROM or RW drive, optical disk drive, or the like, for storing information on various computer-readable media, such as a hard disk, a removable magnetic disk, or a CD or DVD disk. In general, the one or more storage device(s) 155 provide either volatile or non-volatile storage to the portfolio management system 105. It will be appreciated that the information stored within the one or more storage device(s) 155 may be provided by the money manager(s) 120, the investor(s) 115, the portfolio management system 105, and/or other entities in communication with the portfolio management system 105. The one or more storage device(s) 155 can store the trade orders, restrictions, allocation models, resolutions, optional trade sorting rules, and other trade-related information received by or generated by the portfolio management system 105 that the drift module 135 uses in the processes and computations described hereinafter. This information may be requested and/or retrieved by the drift module 135 as necessary to evaluate whether one or more trade orders should be executed.

Although the drift module 135 is described herein as software residing within the memory 110, the drift module 135 may alternatively include a combination of software and hardware, or only hardware. Furthermore, although illustrated as located entirely within the portfolio management system 105, one or more of the portfolio management system 105 components can be distributed such that they are in whole or part external to the portfolio management system 105. As an illustrative example, the one or more storage device(s) 155 may in fact be external to the portfolio management system 105. Additionally, it should be also appreciated by one of ordinary skill in the art that one or more of the portfolio management system 105 components described with respect to FIG. 1 may comprise several components, which are either local to each other or which operate in conjunction with each other to permit the drift module 135 to perform the processes described herein. Additionally, one or more of the portfolio management system 105 components may be combined and/or may be distributed on different computers, systems, platforms, and the like. Therefore, it should be appreciated that the illustrative system 100 shown in FIG. 1 is exemplary, and that almost any combination of software and/or hardware may be utilized to perform the functions described herein.

Next, it should be appreciated that using the system 100 of FIG. 1, a user (e.g., a money manager or broker, possibly working on behalf of an investor) may customize a particular investment account through restrictions. As noted above and in the Restriction Applications, restrictions constrain the ability to use an investment account to trade security instruments, such as buying or selling stocks. For instance, a restriction might stipulate that no more than twenty percent of the total portfolio value of an investment account consist of stock holdings in the telecom industry, or that stock in a particular entity should never drop below ten percent of the total holdings of an investment account. A restriction may prevent one or more trades and may be associated with a resolution rule that stipulates an alternative action that should be performed when the restriction is violated. Restrictions can be established by the money manager(s) 120, investor(s) 115, and/or another entity of the system 100 that establishes the investment account (e.g., a broker-dealer or other client of the money manager).

Restrictions can apply to a single account, all accounts associated with a particular money manager, all accounts managed under a specific style, all accounts associated with a particular program offered to investors, or all accounts associated with a particular client of the money manager. Additionally, restrictions may be established or modified at any point in time, including before an initial allocation of assets, after an initial allocation, or even after one or more account rebalancings.

Illustrative examples of restrictions include: 1) don't buy if ticker=MSFT; 2) allow ticker=CKFR; and 3) don't buy if category=Tobacco. Other restrictions can reflect a desired maximum or minimum (e.g., expressed as either an absolute $ value or a percentage of total account value) that is not already reflected in the asset allocation model. Illustrative examples include: 1) don't buy if ending position in IBM>10% of total account value; 2) don't sell if ending position in HPQ<5% of total account value; 3) don't buy if ending position in cash<$5,000; and 4) don't buy if ending position in Telecom securities>20% of total account value.

As previously described, a restriction may have an explicitly stated or implicit resolution rule associated with it, such that when a restriction violation is detected the resolution rule is executed. For instance, if a restriction stipulates that a particular security cannot be purchased, the resolution rule may stipulate that the assets that were to be used for the restricted purchase be left as cash in the investment account.

A resolution rule can also instruct that money associated with a restricted trade be prorated across the remaining securities in an account, for instance, in accordance with allocation model proportions.

Resolution rules may also include security substitutions. For instance, the resolution rule for the violated restriction "Don't buy if ticker=IBM" might be "Buy ticker=MSFT." In addition to such one-for-one substitutions, security substitutions may include a chain of substitutions, a one-to-many substitution, a group substitution, and a non-specific substitution (dynamic at the time of execution), among other possible combinations. It will be appreciated that the portfolio management system 105 is operable to effect such substitutions and to track those substitutions to facilitate adjustment of the mix of assets in investment accounts having allocation models.

An example of an operation of adjusting the mix of assets in an investment account is account rebalancing, in which the drift for specific securities is identified and trade orders are generated to bring the account in line with the allocation model once again. Rebalancing may be performed for just a portion of an account or for the account as a whole. Rebalancing may be manually triggered by a system user, may be scheduled (e.g., occur on some regular basis at night), or may be automatically triggered as a function of another portfolio management function. It should be appreciated, however, that other portfolio management functions implemented by the portfolio management system 105 may not take the allocation model into account. One such example is performance reporting, in which the gain/loss of actually held assets within a time period is calculated and reported irrespective of how the asset mix compares to a relevant allocation model.

The following illustrative example shows calculation of drift from an allocation model when account rebalancing is performed. This illustrative example is used to illustrate potential problems associated with the determination of drift and the actions ensuing therefrom. In the illustrative example a new investment account has the model of asset allocation 200 shown in FIG. 2.

The investor for the account model shown in FIG. 2 may stipulate, for instance, the following three restrictions: 1) don't buy if ticker=MER; 2) don't buy if ticker=IBM; and 3) don't buy if ticker=SUNW. The resolution rules for each of the restrictions may require that a replacement security be purchased, if available, otherwise the value (i.e., dollar value) of the violating trade may be prorated across the other (allowed) securities in accordance with the allocation model or left in cash. For instance, as shown in FIG. 2, replacement security MSFT is associated with IBM such that MSFT will be purchased if IBM is restricted, which occurs as a result of restriction 2.

If the investor initially deposits $100,000 into his account, at the time of deposit the account will appear as shown in the investment account 300 of FIG. 3. Account rebalancing is then executed, which detects a deviation in asset distribution from the allocation model and generates trade orders to redistribute assets in accordance with the allocation model. The illustrative trade orders 400 shown in FIG. 4 are generated in an attempt to fulfill the allocation model. Before execution each trade order is evaluated against the applicable restrictions. In this illustrative example the trade orders are at odds with two of the restrictions: trade order 1 violates restriction 1 and trade order 4 violates restriction 2. The resolution rules result in the substitution of the securities for trade orders 1 and 4 using the replacement securities identified in the model of FIG. 2. This results in new trade orders 500 for each violated restriction, as shown in FIG. 5.

Figure 5:
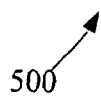
FIG. 5 shows an illustrative table of new trade orders after restriction processing.
Figure 6:
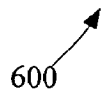
FIG. 6 shows an illustrative table of proration of trade orders.
Figure 7:
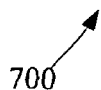
FIG. 7 shows an illustrative table of share prices.

The two additional new trade orders 500 shown in FIG. 5 are also evaluated against the applicable restrictions. Trade order 2 passes, but trade order 1 violates restriction 3. Because there is no replacement security shown for SUNW, a default action is taken, e.g., proration of the value ($25,000) for the purchase of SUNW across the remaining, allowed securities (with a substitution of MSFT for IBM), in accordance with the allocation model. This proration produces new trade orders 600, illustrated in the table of FIG. 6. Next, to illustrate the impact of these trades on final account positions, the share prices 700 shown in FIG. 7 may be assumed for the illustrative account. The final account position 800 reflecting actual share prices and discrete numbers of shares traded is shown in FIG. 8.

The resulting tax lot table 900 corresponding to the individual successful trade orders and reflecting the actual prices and discrete numbers of shares involved in the above-described trades is shown in FIG. 9. A comparison of the final account positions 800 of FIG. 8 and the allocation model 200 of FIG. 2 are illustrated in the table 1000 of FIG. 10, which indicates the drift in the account for each security, represented as a percentage differential between the allocation model and final account positions.

Rebalancing may be effected to determine drift and the trades (including buy and/or sell orders) necessary to realign the account to the allocation model. In the present illustrative example, account rebalancing would attempt to purchase shares of MER and to sell shares of CSCO, CKFR and MSFT. Because MER cannot be purchased based on restriction violations (and because the substitute security SUNW cannot be purchased), the attempted purchase of MER will result in additional trade orders in which the value for the MER purchase is used to repurchase shares of CSCO, CKFR and MSFT. Therefore, inefficient and unnecessary processing results when restrictions and their resolution rules are not taken into account with account models.

The drift module 135 of the present invention prevents inefficient and unnecessary processing by tracking the model securities from the initial trade orders that are associated with each substituted tax lot in a substitute tax lot map table. That substitute tax lot map table can be used by the drift module 135 to create a virtual portfolio used by the portfolio management system 105, and more particularly, the drift module 135, for use in portfolio management functions that use the asset allocation model, such as account rebalancing.

Referring again to the illustrative investment account described above with reference to FIGS. 2-9, substitute tax lots 3 through 6 in the substitute tax lot table 1100 of FIG. 11 represent those tax lots whose securities were substituted as a result of violated restrictions and their associated resolution rules. For instance, substitute tax lot 3 in FIG. 11 illustrates that in the initial trade order, IBM was attempted for purchase, which corresponds to tax lot 3 of FIG. 9, in which the purchase of MSFT replaced IBM as a result of the violation of restriction 2 and the corresponding resolution rule that MSFT be purchased as a replacement security. Additionally, substitute tax lots 4-6 illustrate the attempted purchase of MER after the first account rebalancing, the replacement of MER by SUNW, which violated restriction 3, and the subsequent proration of value for the purchase of MER, which resulted in the three orders shown in FIG. 6. The initial securities responsible for each resulting tax lot, rather than the actual securities or an intermediate security purchased and sold during rebalancing, are tracked by the drift module 135 in a substitute tax lot map table.

A virtual portfolio may then be generated by the drift module 135 using the security attempted for initial purchase to satisfy the allocation model. FIG. 12 shows a virtual securities table 1200 that illustrates the correspondence of actual securities and virtual securities identified and maintained by the drift module 135. The virtual securities shown in FIG. 12 may be tracked by the drift module 135. This is best illustrated with reference to the virtual security tax lot table 1300 of FIG. 13, which illustrates a change in security prices from the prices of FIG. 9 and illustrates both the actual securities and the virtual securities.

Next, the drift module 135 may execute rebalancing and calculate drift based on tax lots grouped by virtual securities. The total position for the virtual security is compared to the allocation model stipulation for that security. The grouping of tax lots by virtual securities is illustrated by the table 1400 of FIG. 14. In generating trade orders to realign the investment account with the allocation model, the virtual securities and the substitute tax lot map table are used by the drift module 135 to identify the actually held securities that must be traded. In particular, the drift module 135 examines the grouped virtual securities to ascertain whether the group of securities is consistent with the asset allocation stipulated by the allocation model. Although the actual securities for tax lots 4-6 are different than the virtual securities, the use of the virtual securities avoids the generation of unnecessary and offsetting trade orders, for instance, as a result of account rebalancing. Thus, in the illustrative example shown above, the tax lots 4-6 associated with the virtual security MER are unaffected and remain accurate to the model proportion for MER. Continuing with the illustrative example, the drift module 135 can execute account rebalancing to realign the positions shown in FIG. 14 in accordance with the allocation model. To effect this change, the drift module 135 executes the trades shown in FIG. 15. MSFT is traded in lieu of IBM, as determined from the substitute tax lot map table.

Figure 16:
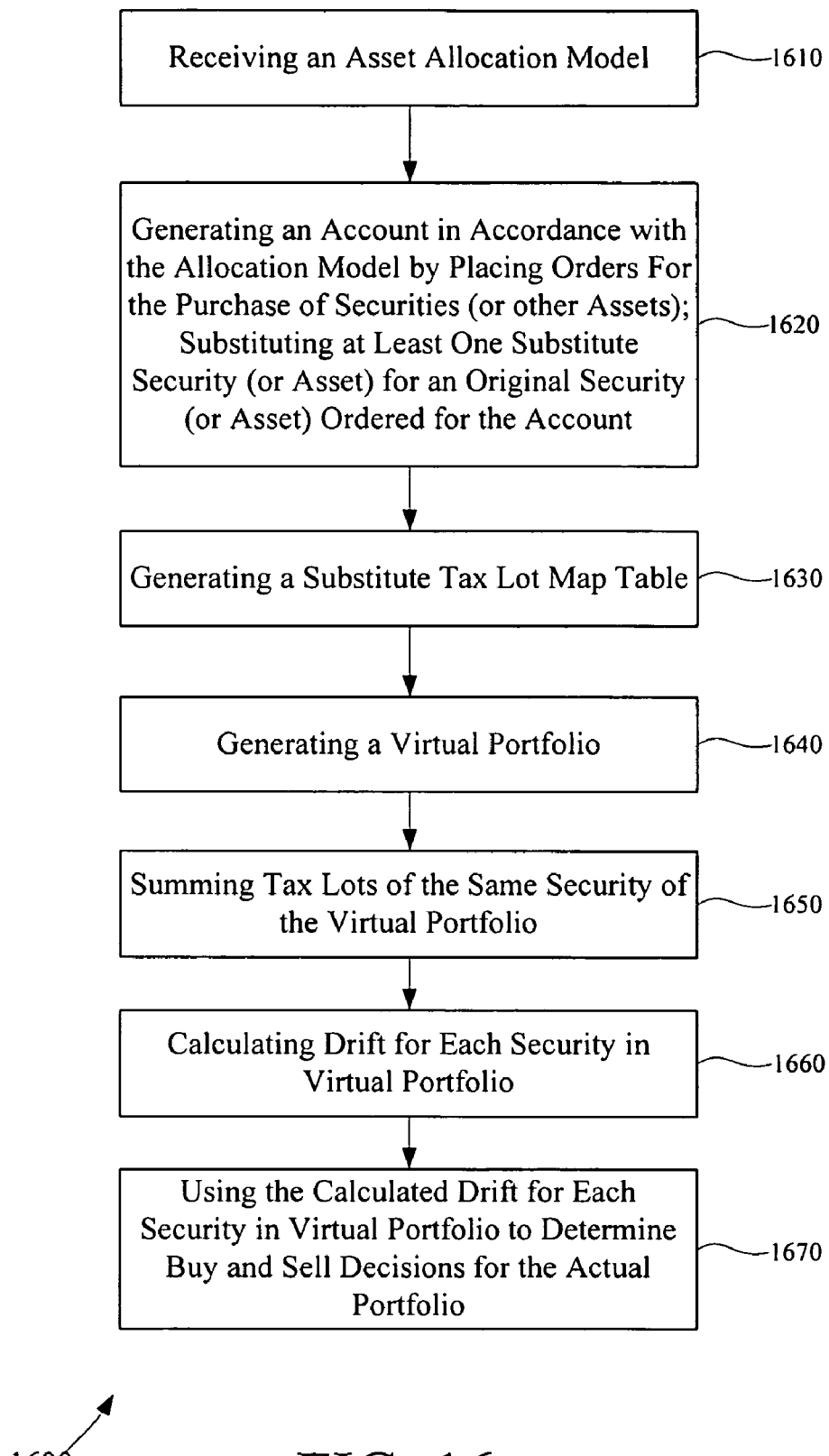
FIG. 16 shows a process flow executed by the drift module, according to an illustrative embodiment of the present invention.

The methods and processes described with respect to the illustrative example described above may be implemented by portfolio management system 105, including the drift module 135. A block diagram process flow 1600 executed by the portfolio management system 105 is shown in FIG. 16, according to an illustrative embodiment of the present invention.

The portfolio management system 105 receives an asset allocation model (block 1610). Although not illustrated, the portfolio management system 105 can also receive one or more restrictions and one or more resolution rules to be executed by the portfolio management system 105 when a restriction is violated. Thereafter, the portfolio management system 105 examines the asset allocation model, restrictions, and associated resolution rules, and places and executes orders to purchase securities and/or other assets in accordance with the asset allocation model, restrictions, and associated resolution rules (block 1620). During the placement and execution of orders the portfolio management system 105 may substitute at least one security—a substitute security—for a security identified by the allocation model and/or for which an original order (block 1620). This may occur, for instance, where the attempted purchase of an original security, mandated by the model, violates a restriction and the associated resolution rule requires that the portfolio management system 105 purchase a substitute security in its place, similar to the illustrative example described above with reference to FIG. 5.

The portfolio management system 105 may then generate a substitute tax lot map table that associates each tax lot of a substituted security (or asset) with the original security from the allocation model (block 1630). The portfolio management system 105 may also generate a virtual portfolio of securities in the investment account, where the virtual portfolio includes at least one security that is not in the actual investment account but which was identified by the allocation model and/or for which an original order was placed (block 1640), as derived from the substitute tax lot table.

Next, the drift module 135 is operable to sum the tax lots of the same virtual securities of the virtual portfolio (block 1650), which permits the drift module to obtain a total account position for each virtual security in the virtual portfolio. Thereafter, the drift for each virtual security (or asset) in the virtual portfolio is calculated (block 1660). This can be calculated as the difference between the virtual security's actual investment account proportion, based on a market valuation of the encompassed actual securities, and the virtual security's ideal account proportion as stipulated by the model. This calculation is represented by the illustrative example shown in FIG. 14. Thereafter, the drift module 135 may generate one or more trades of actual securities, such as buy or sell orders, using the calculated drift for the virtual securities in the virtual portfolio (block 1670) and the substitute tax lot map table. In particular, the drift module 135 can determine what actual securities to buy or sell, and in what amounts, to realign the account with the allocation model.

The illustrative example described above with respect to FIGS. 2-16 illustrates that no unnecessary processing is performed and no unnecessary trade orders are generated when calculating drift based on a virtual portfolio and a substitute tax lot map table. Although the illustrative example provides for only a one-for-one security substitution, one to many or more sophisticated substitutions may also be performed. For instance, if virtual security MER in FIG. 13 had shown substantial drift and accordingly been a target for correction in rebalancing, three tax lots (4, 5, and 6) would be involved according to the substitute tax lot map table 1100 of FIG. 11. Multiple methods to split up a trade across multiple tax lots may be used, including the proration of the trade according to current proportions of the tax lots with respect to each other.

It should also be appreciated that asset allocation models may change over time. When this occurs, a first cycle of processing after the model change can cause a modification of the substitute tax lot map table, and consequently realigns the "virtual portfolio" with the new model. Further, depending on the portfolio management function (trading tool), type of security, and other event conditions and factors, a variety of business rules may affect trade orders and modify actions accordingly. For example, wash sale violation checking may prevent certain trades from occurring, and tax implications may also present trade constraints.

Many modifications and other embodiments of the inventions set forth herein will come to mind to one skilled in the art to which these inventions pertain having the benefit of the teachings presented in the foregoing descriptions and the associated attachments. Therefore, it is to be understood that the inventions are not to be limited to the specific embodiments disclosed and that modifications and other embodiments are intended to be included within the scope of the present disclosure. Although specific terms are employed herein, they are used in a generic and descriptive sense only and not for purposes of limitation.

The invention claimed is:

1. A method, comprising:
   storing an asset allocation model for an investment account, wherein the asset allocation model specifies at least a first asset allocation for a first security and a second asset allocation for a second security;
   maintaining an account portfolio for the investment account that specifies actual holdings of the investment account, wherein the actual holdings include a first tax lot of the first security and a second tax lot of a substitute security for the second security, wherein the second tax lot of the substitute security is obtained based upon executing a modified first trade order, wherein the modified first trade order is a result of:

determining that a restriction applies to a proposed first trade order specifying the second security for the investment account;

modifying the proposed first trade order to replace the second security with the substitute security to generate the modified first trade order;

maintaining a virtual portfolio for the investment account that attributes the first tax lot of the first security to a virtual first security, and the second tax lot of the substitute security to a virtual second security, wherein the virtual first security corresponds to the first security and the virtual second security corresponds to the second security;

calculating a first total account position associated with the virtual first security, and a second total account position associated with the virtual second security, wherein the first total account position comprises one of (i) a first total monetary value of tax lots associated with the first virtual security, or (ii) a first percentage representing a proportion of the first total monetary value of the tax lots associated with the first virtual security to a second total monetary value of the investment account, and wherein the second total account position comprises one of (i) a third total monetary value of tax lots associated with the second virtual security, or (ii) a second percentage representing a proportion of the third total monetary value of the tax lots associated with the second virtual security to the second total monetary value of the investment account; and determining drift of the investment account from the asset allocation model based at least on calculating (i) a first drift between the first total account position and a first desired total account position determined based upon the first asset allocation for the first security, and (ii) a second drift between the second total account position and a second desired total account position determined based upon the second asset allocation for the second security, wherein the first desired total account position comprises one of (i) a first model percentage for the first security or (ii) a fourth total monetary value for the first security calculated by applying the first model percentage for the first security to the second total monetary value of the investment account, and wherein the second desired total account position comprises one of (i) a second model percentage for the second security or (ii) a fifth total monetary value for the second security calculated by applying the second model percentage for the second security to the second total monetary value of the investment account; and generating, responsive to the determining of the drift of the investment account, a second trade order, wherein the prior steps are performed by one or more computers associated with a portfolio management system.

2. The method of claim 1, wherein the substitute security is a first substitute security, and the wherein the actual holdings further include a third tax lot of a second substitute security for the second security.

3. The method of claim 2, wherein calculating the second total account position associated with the virtual second security includes calculating the second total account position based upon the second tax lot of the first substitute security and the third tax lot of the second substitute security.

4. The method of claim 2, wherein the second substitute security is the same as the first security.

5. The method of claim 1, wherein the actual holdings of the investment account further include a third tax lot of the first security, and wherein the virtual portfolio for the investment account attributes the third tax lot of the first security to the virtual second security.

6. The method of claim 1, wherein calculating the first total account position associated with the virtual first security comprises summing respective account positions for all tax lots associated with the virtual first security, and wherein calculating a second total account position associated with the virtual second security comprises summing respective account positions for all tax lots associated with the virtual second security.

7. The method of claim 1, wherein the second trade order is generated to bring the virtual portfolio into compliance with the asset allocation model.

8. The method of claim 1, wherein the substitute security and the first security are a same security.

9. The method of claim 1, wherein the substitute security is (i) a sole substitute security in a one-for-one security substitution, (ii) one of a plurality of substitute securities in a one-to-many security substitution or a group substitution.

10. The method of claim 1, wherein the restriction is a first restriction, the substitute security is a first substitute security, and the first restriction is associated with a resolution rule associated with a second substitute security, and further comprising:

determining that a second restriction applies with respect to the second substitute security, wherein the proposed first trade order is modified to replace the second security with the first substitute security to generate the modified first trade order as a result of determining that the second restriction applies with respect to the second substitute security, wherein the prior step is performed by one or more computers associated with a portfolio management system.

11. The method of claim 1, wherein the second trade order is for the substitute security.

12. A system, comprising:

a memory for storing computer program instructions; and a processor configured to access the memory and execute the computer program instructions to:

store, in the memory, an asset allocation model for an investment account, wherein the asset allocation model specifies at least a first asset allocation for a first security and a second asset allocation for a second security;

maintain an account portfolio for the investment account that specifies actual holdings of the investment account, wherein the actual holdings include a first tax lot of the first security and a second tax lot of a substitute security for the second security, wherein the second tax lot of the substitute security is obtained based upon executing a modified first trade order, wherein the modified first trade order is a result of:

determining that a restriction applies to a proposed first trade order specifying the second security for the investment account;

modifying the proposed first trade order to replace the second security with the substitute security to generate the modified first trade order;

maintain a virtual portfolio for the investment account that attributes the first tax lot of the first security to a virtual first security, and the second tax lot of the substitute security to a virtual second security, wherein the virtual first security corresponds to the first security and the virtual second security corresponds to the second security;

calculate a first total account position associated with the virtual first security, and a second total account position associated with the virtual second security, wherein the first total account position comprises one of (i) a first total monetary value of tax lots associated with the first virtual security, or (ii) a first percentage representing a proportion of the first total monetary value of the tax lots associated with the first virtual security to a second total monetary value of the investment account, and wherein the second total account position comprises one of (i) a third total monetary value of tax lots associated with the second virtual security, or (ii) a second percentage representing a proportion of the third total monetary value of the tax lots associated with the second virtual security to the second total monetary value of the investment account; and determine drift of the investment account from the asset allocation model based at least on calculating (i) a first drift between the first total account position and a first desired total account position determined based upon the first asset allocation for the first security, and (ii) a second drift between the second total account position and a second desired total account position determined based upon the second asset allocation for the second security, wherein the first desired total account position comprises one of (i) a first model percentage for the first security or (ii) a fourth total monetary value for the first security calculated by applying the first model percentage for the first security to the second total monetary value of the investment account, and wherein the second desired total account position comprises one of (i) a second model percentage for the second security or (ii) a fifth total monetary value for the second security calculated by applying the second model percentage for the second security to the second total monetary value of the investment account; and generate, responsive to the determining of the drift of the investment account, a second trade order.

13. The system of claim 12, wherein the substitute security is a first substitute security, and the wherein the actual holdings further include a third tax lot of a second substitute security for the second security.

14. The system of claim 13, wherein the processor is configured to calculate the second total account position associated with the virtual second security by calculating the second total account position based upon the second tax lot of the first substitute security and the third tax lot of the second substitute security.

15. The system of claim 13, wherein the second substitute security is the same as the first security.

16. The system of claim 12, wherein the actual holdings of the investment account further include a third tax lot of the first security, and wherein the virtual portfolio for the investment account attributes the third tax lot of the first security to the virtual second security.

17. The system of claim 12, wherein the processor is configured to calculate the first total account position associated with the virtual first security by summing respective account positions for all tax lots associated with the virtual first security, and wherein the processor is configured to calculate a second total account position associated with the virtual second security by summing respective account positions for all tax lots associated with the virtual second security.

18. The system of claim 12, wherein the second trade order is generated to bring the virtual portfolio into compliance with the asset allocation model.

19. The system of claim 12, wherein the substitute security and the first security are a same security.

20. The system of claim 12, wherein the substitute security is (i) a sole substitute security in a one-for-one security substitution, (ii) one of a plurality of substitute securities in a one-to-many security substitution or a group substitution.

21. The system of claim 12, wherein the restriction is a first restriction, the substitute security is a first substitute security, and the first restriction is associated with a resolution rule associated with a second substitute security, and wherein the processor is further configured to:

determine that a second restriction applies with respect to the second substitute security, wherein the proposed first trade order is modified to replace the second security with the first substitute security to generate the modified first trade order as a result of determining that the second restriction applies with respect to the second substitute security.

22. The system of claim 12, wherein the second trade order is for the substitute security.

* * * * *

UNITED STATES PATENT AND TRADEMARK OFFICE
CERTIFICATE OF CORRECTION

PATENT NO.        : 7,711,626 B2                                             Page 1 of 1
APPLICATION NO.   : 11/480688
DATED             : May 4, 2010
INVENTOR(S)       : Nanjundamoorthy et al.

It is certified that error appears in the above-identified patent and that said Letters Patent is hereby corrected as shown below:

Column 11, Line 64 – Change "the wherein" to --wherein--

Column 14, Line 2 – Change "the wherein" to --wherein--

Signed and Sealed this

Sixth Day of July, 2010

David J. Kappos
*Director of the United States Patent and Trademark Office*